2,705,734

METHOD FOR OBTAINING PURE OLEFINES FROM OLEFINE CONTAINING HYDROCARBON MIXTURES

Heinrich Tramm, Mulheim an der Ruhr-Speldorf, and Nikolaus Geiser and Helmut Kolling, Duisburg-Hamborn, Germany, assignors to Ruhrchemie Aktiengesellschaft, Oberhausen-Holten, Germany, a corporation of Germany No Drawing. Application March 20, 1951,
Serial No. 216,668

Claims priority, application Germany March 23, 1950

9 Claims. (Cl. 260—683)

This invention relates to a method for obtaining pure olefines from olefine containing hydrocarbon mixtures.

Pure olefine hydrocarbons are needed for many purposes in the chemical industry, such as in the catalytic addition of water gas to olefine hydrocarbons for the manufacture of aldehydes and alcohols. In addition to the saturated hydrocarbons, aliphatic olefines are present in larger or smaller quantities in the products obtained from the catalytic hydrogenation of carbon monoxide and in the fission products of synthetic or natural hydrocarbons, e. g. petroleum paraffin. A simple method for obtaining pure olefines from starting products of this type, especially if the olefine contents are small, is not known at present. The separation of such olefines is impossible. The treatment with liquid sulfur dioxide and many other extraction agents does not produce satisfactory results.

One object of this invention is to separate pure olefines from olefine containing hydrocarbon mixtures such as the type described above.

It has now been found that pure olefines may be obtained from olefine containing hydrocarbon mixtures of any origin and any concentration in a simple manner, if the starting material is first split up into single fractions of the same number of C atoms. Then the olefine hydrocarbons contained in the various fractions are converted into aliphatic monochlorides with zinc chloride and hydrochloric acid, the resulting reaction mixture is split by distillation into alkylmonochlorides and saturated hydrocarbons, the alkylmonochlorides are converted into olefine hydrocarbons by splitting off the hydrogen chloride and the split off hydrogen chloride is returned into circulation.

Various methods have been known for adding hydrogen chloride to olefine containing hydrocarbons, for example, hydrocarbons of the molecular size $C_2$ to $C_6$ can be passed in the form of vapors at a temperature of between 180–200° C. over zinc chloride catalysts. In this process the zinc chloride used is activated through halogen compounds of monovalent or polyvalent metals and is deposited on porous carriers, such as on silica gel. Activated silicic acid which is impregnated with a 10% mixture of anhydrous zinc chloride and titanium chloride can also be used as a catalyst. Besides activated silicic acid, charcoal, activated carbon or aluminum oxide may also be used as suitable carriers. Chlorides of other bivalent and polyvalent metals have also been proposed as catalysts in the addition of hydrogen chloride to olefines.

These known methods for the preparation of alkylmonochlorides from olefines and hydrogen chloride however have the disadvantage that the hydrocarbons must first be vaporized.

It has been found that the conversion required for the process according to the invention of the olefines and olefinic hydrocarbon fractions, which are liquid under normal conditions (760 mm. Hg, 15° C.), into alkylmonochlorides can be carried out if they are treated below 100° C. and at normal or increased pressure in the liquid phase with hydrogen chloride in the presence of zinc chloride. The zinc chloride is used in the form of zinc chloride-hydrocarbon addition compounds (zinc chloride contact oil) or of aqueous zinc chloride solutions.

The catalyst does not have to contain any carrier substances or activating additions of other metal halide compounds. It is sufficient if the olefine to be chlorinated is brought into intimate contact with the zinc chloride. Hydrogen chloride must be passed into the hydrocarbon simultaneously.

In the discontinuous execution of the process according to the invention, solid zinc chloride is distributed as uniformly as possible in the olefine mixture, which is to be processed, by intensive stirring. In a similar manner as in the treatment of olefine hydrocarbons with aluminum chloride, addition compounds result from this process by the interaction of zinc chloride and hydrocarbons with the formation of a socalled "contact-oil layer." When the reaction is completed and the stirring is stopped, this contact oil separates out on the bottom of the container as the lowest layer. By the addition of small quantities of zinc chloride, the contact oil can always be re-activated into its original state.

The best procedure, according to the invention, is to put about 5–10% zinc chloride, relative to the hydrocarbon quantity to be processed, as a permanent supply, into the stirring apparatus which is used for the reaction, before the start of the hydrogen chloride addition. In all subsequent charges, this contact-oil supply is activated with 0.2–0.5% of the $ZnCl_2$, relative to the hydrocarbon to be processed.

Gaseous hydrogen chloride is passed into the mixture, consisting of contact-oil and olefine-containing hydrocarbon, with constant stirring. If the stirring is sufficiently fast, the decomposition between the hydrocarbon and the hydrogen chloride is completed in 1–2 hours. The temperatures are suitably maintained at 30–80° C. during the decomposition.

Instead of the zinc chloride contact-oil, which forms automatically out of anhydrous zinc chloride, hydrocarbon and alkyl-chlorides, aqueous zinc chloride solutions can also be used as a catalyst for the addition of hydrogen chloride to olefines. In this case, no contact-oil is formed so that the decrease in yield, which is caused thereby, does not occur. The concentration of the zinc chloride solution should preferably be above 50%, suitably 60–80%. The reaction temperatures should preferably be set at 70–100° C. Under these conditions, it is possible to obtain practically a 100% addition of hydrochloric acid to olefines with aqueous solutions of zinc chloride. It is especially advantageous to carry out the hydrogen chloride addition continuously. For this purpose it is preferable to use a vertical reaction tube which contains filling bodies and is provided with a heating and cooling arrangement. A space free from filling bodies inside of the reaction tube below or above the column of filling bodies may be provided. The reaction tube is filled with zinc chloride contact-oil or an aqueous zinc chloride solution up to the upper level of the filling body column.

The olefine hydrocarbon to be processed and the hydrogen chloride are fed into the filling body column at the bottom. The time of stay of the hydrocarbon in the reaction tube should be set for about 1–2 hours. The use of an excess of hydrogen chloride gas is recommended so that an intimate mix of the reactants, i. e. the contact-oil or the aqueous zinc chloride solution and the hydrocarbons is obtained.

The resulting alkyl-chloride is drawn out of the upper space through an overflow device and is, possibly, passed on for an after treatment. For the maintenance of the contact-oil it is suitable to feed small quantities of zinc chloride or fresh contact-oil in from the bottom. In this process, the excess contact-oil is carried away out of the hydrocarbon mixture at the top, is separated in a separator, and, after being activated is conducted back into the contact column from the bottom. If an aqueous $ZnCl_2$ solution is used in the process, the zinc chloride solution is replenished by putting small quantities of a fresh zinc chloride solution in at the upper end of the filling bodies. The excess zinc chloride is drawn off at the lower free space.

By means of the described hydrogen chloride addition process it is possible to not only process pure olefine hydrocarbons but also hydrocarbons mixtures which contain a very small amount of olefines. The end product contains less than 1% non-converted olefine in all cases. If zinc chloride contact oil is used, in addition to the alkylmonochlorides only small amounts of zinc chloride addition compounds are formed, which contribute to the replenishment of the so-called contact-oil. As an average, not more than 1% of the olefines put in are used for the formation of the contact-oil. Other by-products, such as polymerization products, etc., are not formed so that usually more than 98% of the theoretical conversion is obtained. If the addition of hydrogen chloride is carried out with aqueous $ZnCl_2$ solutions according to the invention, no decrease of the yield through the formation of contact-oil occurs.

The de-chlorination of the alkylmonochlorides separated out by distillation can be effected by any known method. It is particularly advantageous to treat the alkylmonochlorides in their liquid phase at temperatures of approximately 180–250° C. with aluminum hydrosilicates, e. g. with bleaching clays.

The hydrogen chloride gas split off during the de-chlorination is used for the treatment of additional quantities of olefine-containing hydrocarbons. In this way no chlorine is used up so that the pure olefines can be obtained by means of a very simple hydrochloric acid addition in the presence of zinc chloride with a subsequent vacuum distillation while the hydrochloric acid is continuously circulated.

The aliphatic alcohols present in the fractions to be treated are also converted into pure mono-olefines. Such alcohols are present primarily in products of the catalytic hydrogenation of carbon monoxide. In this process it must be kept in mind that in the boiling range of a certain C number there is also present, at the same time, the alcohol which has 3 carbon atoms less. For this reason, only fractions within very narrow limits can be processed since otherwise the alkyl monochlorides can not be separated from the saturated hydrocarbon on account of overlapping boiling points.

The following examples are given by way of illustration and not limitation.

*Example 1*

A $C_{10}$ fraction, which contained 30% by volume of olefine (iodine number=54) and 3% by volume of alcohols (OH number=10), was taken out of carbon monoxide-hydrogenation products obtained with the use of cobalt catalysts. 500 gm. of this fraction were put into a stirring vessel of 1000 cc. capacity. 100 gm. of $ZnCl_2$ contact-oil from a previous charge were already present in this stirring vessel, which were replenished with 2 gm. of $ZnCl_2$ when the new hydrocarbon was brought in. After that, the mixture was stirred intensively for 2 hours, during which time an amount of 50 gm. of hydrogen chloride gas were passed in. During the reaction the temperature rose slowly from 20° to 70° C. After the completion of the reaction, the stirring was stopped. The contents of the vessel separated into two layers. The lower layer contained the zinc chloride (contact-oil). The upper layer was decanted and freed from the hydrochloric acid by washing. It yielded 537 gm. of a reaction product with a residue of 0.6% of olefine (iodine number=1, hydroxyl number=0). Out of this, 184 gm. of $C_{10}$-monochloride and 10 gm. of $C_7$-monochloride were isolated by distillation. 0.5 kg. of the $C_{10}$-mono-chloride obtained above, mixed with 5 gm. of "Tonsil," i. e. activated bleaching earth per hour were stirred into a still of 0.5 liter capacity, with an attached fractionating column 2 m. high and an inside diameter of 50 mm., which was filled with 5 mm. glass rings and provided with a cooler for total condensation. The still was provided with a stirrer in order to prevent the adhesion of the "Tonsil." The product running out of the still was led into a second still of .25 liter capacity which—on the gas side—was connected with the same fractionating column. The polymerization products, which had a higher boiling point than $C_{10}$, were drained out of the pit of this second still. The hydrochloric acid and the $C_{10}$ olefine fraction accumulated at the top of the column. The chlorine residue of this fraction amounted to about 1%. The distillate was distilled once more, at a reflux ratio of 1:10, in a second distillation column, 2 m. high and filled with 5 mm. glass rings, during which process the product from the pit was added to the starting product of the first distillation column. The final distillate was a product as clear as water, which had a chlorine residue of less than 0.05% and an olefine content of practically 100%, as determined by the iodine number. The ratio by weight of the olefine distillate to the polymerization product (in the pit of the second still) was 96%:4%.

Examples 2 and 3 illustrate the addition of Cl to olefines with the use of zinc chloride.

*Example 2*

500 gm. of an aliphatic $C_8$-hydrocarbon fraction, which contained 50% by volume of olefines, was put into a stirring vessel with a capacity of 1000 cc. At the same time, 100 gm. of an aqueous solution, which contained 70% of $ZnCl_2$, were added. The mixture was stirred for 2 hours at a temperature of 70–80° C. Simultaneously 105 gm. of gaseous hydrogen chloride were slowly passed in. Then the upper layer was separated from the aqueous contact solution and washed until it was free from zinc chloride and HCl residues. The upper layer yielded 580 gm. of a reaction product with a residual content of less than 0.5% of olefines.

*Example 3*

Glass rings with a diameter of 5 mm. were put as filling bodies into a vertical glass tube, 2 m. in length and 20 mm. in diameter, in such a way that there was a space free from filling bodies at the top and at the bottom, each 2 mm. high. This reaction tube was filled with an aqueous solution, which contained 65% of $ZnCl_2$, up to the upper level of the filling body layer. 150 gm. of an aliphatic $C_9$ hydrocarbon fraction, which contained 38% by volume of olefines, were fed in at the lower level of the filling bodies every hour. In addition, 35 gm. per hour of gaseous hydrogen chloride were passed in at the lower level of the filling body layer. The reaction temperature was kept at 80–85° C. by means of a heating jacket. The chlorination mixture, which ran off continuously out of the upper free space, was freed from its hydrochloric acid and zinc chloride residues with bleaching clay and water. Its olefin contents was less than 1%.

We claim:

1. Process for obtaining pure olefins from olefin-containing hydrocarbon mixtures which are liquid at normal temperatures, which comprises separating such a hydrocarbon mixture into single fractions of the same number of C atoms, reacting the individual fractions with hydrochloric acid in intimate contact with an aqueous zinc chloride solution containing more than 50% zinc chloride to convert the olefinic hydrocarbons present therein into aliphatic monochlorides, distilling the reaction mixtures formed, and separating alkyl monochlorides and saturated hydrocarbons, splitting off hydrogen chloride from the alkyl monochlorides, and recovering olefin hydrocarbons.

2. Process according to claim 1, in which the split off hydrogen chloride is passed back into the reaction for re-use.

3. Process according to claim 1, in which the addition of the hydrogen chloride to the olefine containing single fractions is made in the liquid phase at a temperature not exceeding 100° C. at normal pressures in a layer of aqueous zinc chloride solution.

4. Process according to claim 3, in which the addition of hydrogen chloride is made at increased pressure.

5. Process according to claim 1, in which zinc chloride is present in about 60–80% in the aqueous zinc chloride solution.

6. Process according to claim 1, in which the olefine containing hydrocarbon fractions are contacted with aqueous zinc chloride solution with stirring while gaseous hydrogen chloride is added.

7. Process according to claim 1, in which the olefine containing fractions are continuously fed in from below through an aqueous zinc chloride solution with hydrogen chloride, the alkylmonochloride formed being recovered from the top of the solution.

8. Process according to claim 1, in which the olefine containing fractions are continuously fed in from below through an aqueous zinc chloride solution with hydrogen chloride, alkylmonochloride being recovered from the top of the solution.

9. Process according to claim 1, in which the hydrogen chloride is separated from the alkylmonochloride in the liquid phase with the addition of aluminum hydrosilicates.

References Cited in the file of this patent

UNITED STATES PATENTS

| | | |
|---|---|---|
| 2,181,642 | McMillan | Nov. 28, 1939 |
| 2,445,520 | Francis et al. | July 20, 1948 |
| 2,469,702 | Schwegler et al. | May 10, 1949 |
| 2,485,265 | Eby | Oct. 18, 1949 |
| 2,491,786 | Weinrich | Dec. 20, 1949 |